United States Patent [19]  [11] 4,093,470
Cherry  [45] June 6, 1978

[54] ALUMINA REFRACTORIES

[75] Inventor: Carl James Cherry, King of Prussia, Pa.

[73] Assignee: Combustion Engineering, Inc., Windsor, Conn.

[21] Appl. No.: 734,141

[22] Filed: Oct. 20, 1976

[51] Int. Cl.² ............................................. C04B 35/10
[52] U.S. Cl. ...................................... 106/56; 106/67; 106/68; 106/65
[58] Field of Search .................. 106/65, 67, 68, 56

[56] References Cited

U.S. PATENT DOCUMENTS

| | | | |
|---|---|---|---|
| 3,067,050 | 12/1962 | Miller | 106/65 |
| 3,121,640 | 2/1964 | Miller, Jr. | 106/68 |
| 3,652,307 | 3/1972 | Bakker | 106/65 |
| 3,841,888 | 10/1974 | Farris et al. | 106/65 |

Primary Examiner—Patrick P. Garvin
Assistant Examiner—J. V. Howard
Attorney, Agent, or Firm—Richard H. Berneike

[57] ABSTRACT

An alumina refractory material and its method of preparation are disclosed. The material includes a volatilized silica binder wherein the volatilized silica binder is added to the batch as a thoroughly dispersed, acidified, aqueous slurry. Graphite and silicon carbide may also be included to control erosion by molten metal. Green strength binders are also usually included.

11 Claims, No Drawings

ALUMINA REFRACTORIES

BACKGROUND OF THE INVENTION

This invention relates to alumina containing refractories having a volatilized silica binder. It has been known that a volatilized silica binder produces superior characteristics when used in alumina refractory mixtures. The properties which may be improved by the inclusion of the proper proportions of volatilized silica include modulus of rupture, apparent porosity, linear change, volume change and spalling.

Volatilized silica, which is also referred to as fumed silica, is an amorphous silica which has been deposited from a vapor phase. A typical silica of this type results from the reduction of silica to form silicon alloys such as ferrosilicon. A similar silica fume can also be produced by reducing quartz with carbon or other suitable reducing agent, treating the vaporous products of the reduction with an oxygen yielding gas, and condensing the silica in finely divided form. An analysis of such a silica would run at least 90 percent $SiO_2$ and normally runs about 95 percent, with between 2 and 3 percent of total FeO, MgO and $Al_2O_3$.

Refractories of this type are prepared by grinding, screening and blending the desired alumina material to give the desired alumina content with the remainder consisting essentially of the other natural constituents of the alumina ore used. The exact screen sizing to be used is dependent upon such factors as the raw materials used and the purpose to which the refractory is to be put but this is a matter well within the knowledge and skill of those familiar with the refractory field. It is then conventional practice to blend into the batch the volatilized silica in an amount from at least about 1 percent up to about 10 percent by weight of the batch. This volatilized silica is added in the dry form. A temporary binder, of which a wide variety are known and used in the manufacture of refractory materials, is then added to the batch and the batch is tempered with water to give the desired consistency. For a further discussion of the use of volatilized silica in alumina refractories, reference may be had to U.S. Pat. Nos. 3,067,050 and 3,652,307. Refractories of this type may be employed to form brick or they may be used as ramming or gunning materials.

SUMMARY OF THE INVENTION

The present invention involves an alumina refractory material with a volatilized silica binder and its method of preparation and has the objective of improving the properties by forming a dispersed, acidified, aqueous slurry of the volatilized silica which is then mixed with the refractory batch. The batch may also include graphite, silicon carbide and green strength binders.

DESCRIPTION OF THE PREFERRED EMBODIMENTS

The present invention relates to alumina refractories and more particularly to those alumina refractories which are classified as having a high alumina content. This is generally considered to include refractories containing from about 50 to 99 percent $Al_2O_3$. Although the invention will be described with reference to such high alumina refractories, it is to be understood that the invention is not so limited and it includes all refractories which can employ volatilized silica as a binder.

Volatilized silica, as previously indicated, is an amorphous silica which has been deposited from a vapor phase. The particles are substantially all finer than 0.3 microns and have a typical particle size range of from 0.3 to 0.03 microns.

The volatilized silica is prepared in an acidified slurry form prior to being mixed with the refractory particles and other ingredients. The slurry is prepared by mixing the volatilized silica with water, an acid and a dispersant. The following table gives the preferred composition and the range of permissible compositions for the slurry:

|  | Preferred Weight % | Range Weight% |
| --- | --- | --- |
| Water | 76.3 | 60.0 – 90.0 |
| Concentrated HCl | 0.5 | 0.1 – 2.0 |
| Dispersant | 0.2 | 0.05 – 1.5 |
| Volatilized Silica | 23.0 | 10.0 – 40.0 |

This slurry differs from a colloidal silica suspension in that the silica particles are perhaps 10 times as large. A colloidal suspension is much more expensive to produce because it starts with a sodium silicate solution and uses ion exchange procedures. The volatilized silica is an inexpensive source of silica. The use of the acidified, aqueous slurry instead of the dry blending of the silica with the refractory promotes solution of at least a part of the silica in the water and thereby enhances the bonding properties. Also, an aqueous slurry assures a more uniformed dispersion of the silica in the refractory particles than would be obtained with dry blending. The slurry form also reduces dust losses of the fume during blending. The fact that the slurry is acidified produces qualities superior to those obtained with an unacidified slurry. The acid has the effect of reacting with the volatilized silica to form an adhesive silicic acid so that it performs better as a binder. Although hydrochloric acid is the preferred acid, phosphoric acid may also be used since it forms a bond with the silica which is the same as or equivalent to the silicic acid bond formed by the hydrochloric acid. The concentrated hydrochloric acid referred to in the above table is 20°Be (32% HCl) but equivalent amounts of other concentrations may be used.

The volatilized silica slurry also contains a dispersant that permits a high solids loading of the slurry. Any substance capable of imparting a like charge on the particulate matter in the acidified slurry will cause the particles to repel each other and thereby remain mobile. This will prevent the solids from aggregating into a viscous mass. One such dispersant which can be employed in a water soluble powder sold under the trademark "Toranil B" which is a desugared extract of coniferous wood consisting of 96 percent calcium salt of lignosulfonic acid and 1.2 percent glucose. Some other dispersants which can be used are the highly polymerized napthalene sulfonates and the alkali salts of polyacrylates. Other dispersants can be used so long as they are compatible with the system. Highly alkaline dispersants such as sodium silicates would cause precipitation in the acid medium and would not be compatible.

The volatilized silica slurry of the present invention is mixed with an aggregate refractory material of relatively large particle size, calcined alumina or relatively fine particle size, graphite and a green strength binder. Other option ingredients may be included as discussed hereinafter.

The aggregate material may be selected from alumina or alumina containing materials such as fused alumina, tabular alumina and calcined kaolin. The aggregate materials will have particle size distributions primarily in the range of 3 mesh to 100 mesh or what are conventionally referred to as minus 3 mesh, minus 4 mesh, minus 6 mesh or minus 8 mesh aggregate. Some examples are as follows:

| Crushed Fused Alumina, −4 Mesh | | |
|---|---|---|
| U.S. Standard Mesh | Minimum % | Maximum % |
| +4 | 0.0 | 5.0 |
| +6 | 7.5 | 12.5 |
| +8 | 15.0 | 25.0 |
| +10 | 5.0 | 10.0 |
| +14 | 15.0 | 25.0 |
| +20 | 8.5 | 14.5 |
| −20 | 23.0 | 33.0 |

| Tabular Alumina, −6 Mesh | | |
|---|---|---|
| U.S. Standard Mesh | Minimum % | Maximum % |
| +6 | 0.0 | 1.0 |
| +10 | 10.0 | 30.0 |
| +20 | 30.0 | 40.0 |
| +30 | 6.0 | 11.0 |
| +70 | 8.0 | 19.0 |
| −70 | 5.0 | 18.0 |

| Calcined Kaolin, −8 Mesh | | |
|---|---|---|
| U.S. Standard Mesh | Minimum % | Maximum % |
| +8 | 0.0 | 1.0 |
| +20 | 30.0 | 50.0 |
| +40 | 17.0 | 33.0 |
| +60 | 8.0 | 18.0 |
| +100 | 6.0 | 16.0 |
| −100 | 6.0 | 15.0 |

The fine calcined alumina particles preferably have a particle size of about 325 mesh or smaller and no more than about 5 percent should be retained on a 325 mesh screen. The calcined alumina particles probably form a strong mullite (an aluminum silicate) bond with the silica fume. The graphite in the mixture retards erosion of the resulting refractory material. Any naturally occuring graphite is suitable which contains at least 75 to 80 percent carbon. Lower grade graphites will provide too much harmful ash. The graphite preferably has a particle size of what is commonly referred to as minus 40 mesh. A typical 40 mesh Mexican graphite has the following particle size distribution:

| U.S. Standard Mesh | Maximum % |
|---|---|
| +10 | 0.0 |
| +20 | 1.5 |
| +30 | 4.0 |
| −200 | 36.9 |

The green strength binder is selected from the conventional materials used for this purpose such as western bentonite and the various bond and ball clays. These materials are all of relatively fine particle size and typically have no more than about 7 percent retained when washed through a 270 mesh screen. Other bonding materials may be used such as the "Toranil B" binder previously discussed and asphaltite binders. One asphaltite binder which can be used is sold commercially as "Corez Resin" and it is a composition of a naturally occuring asphaltite of complex molecular structure and additives of organic binder and inert filler.

Optional ingredients in the mixture of the present invention are kyanite and silicon carbide. The kyanite expands on heating by a process referred to as mullitization to compensate for the normal shrinkage of clay refractories and seals cracks due to the shrinkage. The silicon carbide has high thermal conductivity and a good refractoriness. It aids the development of a ceramic bond further away from the hot face of the refractory by improving the heat flow to the cooler regions. The preferred particle size distribution is −30 +50 mesh as follows:

| U.S. Standard Mesh | Minimum % | Maximum % |
|---|---|---|
| +20 | 0.0 | 0.0 |
| +30 | 0.0 | 5.0 |
| +40 | 70.0 | 90.0 |
| +50 | 2.0 | 10.0 |
| −50 | 0.0 | 5.0 |

Some examples of alumina refractory materials according to the present invention are as follows:

Example I

| | Preferred Weight % | Range Weight % |
|---|---|---|
| Crushed fused Alumina, −4M | 24.0 | 15 −50 |
| Silicon Carbide, −30 +50M | 7.25 | 5 − 30 |
| Graphite, −40M | 7.25 | 5 − 20 |
| Asphaltite Binder | 6.08 | 3 − 15 |
| Calcined Alumina, −325M | 41.37 | 15 − 45 |
| Clay Binder | 2.55 | 1 − 15 |
| Volatilized Silica Slurry | 9.61 | 2 − 20 |
| Water | 1.87 | 0 − 5 |

Example II

| | Preferred Weight % | Range Weight % |
|---|---|---|
| Tabular Alumina, −6M | 52.5 | 40 − 60 |
| Calcined Alumina, −325M | 25.0 | 15 − 35 |
| Western Bentonite | 4.0 | 1 − 6 |
| Graphite, −40M | 7.5 | 5 −20 |
| Dispersant - Binder | 1.0 | 0.5 −2 |
| Volatilized Silica Slurry | 10.0 | 2 − 20 |
| Water | 0 | 0 − 5 |

Example III

| | Preferred Weight % | Range Weight % |
|---|---|---|
| Calcined Kaolin, 8–40M | 50.0 | 40 − 60 |
| Calcined Alumina, −325M | 8.0 | 6 − 20 |
| Raw Kyanite, −35M | 8.7 | 4 − 15 |
| Bond Clay | 16.4 | 6 − 35 |
| Graphite | 5.9 | 5 − 20 |
| Dispersant - Binder | 1.0 | 0.5 − 2 |
| Volatilized Silica Slurry | 10.0 | 2 − 20 |
| Water | 0 | 0 − 5 |

Example IV

| | Preferred Weight % | Range Weight % |
|---|---|---|
| Alumina Aggregate, −4M | 50.0 | 15 − 60 |
| Calcined Alumina, −325M | 22.5 | 6 − 45 |
| Graphite | 7.5 | 5 − 20 |
| Binder | 10.0 | 1 − 35 |
| Volatilized Silica Slurry | 10.0 | 2 − 20 |

| | Preferred Weight % | Range Weight % |
|---|---|---|
| Water | 0 | 0 – 5 |

While specific formulations for the present invention have been described, it is to be understood that these are by way of illustrations and that the invention is to be limited only by way of the claims as appended.

What is claimed is:

1. An unshaped, unfired refractory material for use in monolithic refractory construction comprising a mixture of a volatilized silica slurry and a refractory batch wherein said volatilized silica slurry comprises:
   a. from 60.0 to 90.0 weight percent water,
   b. from 10.0 to 40.0 weight percent volatilized silica,
   c. from 0.1 to 2.0 weight percent concentrated acid, and
   d. from 0.05 to 1.5 weight percent dispersant, and wherein said mixture comprises:
   a. from 15 to 60 weight percent of an aggregate alumina-containing refractory of a relatively large particle size,
   b. from 6 to 45 weight percent calcined alumina of a relatively small particle size,
   c. from 5 to 20 weight percent graphite,
   d. from 1 to 35 weight percent of a green strength binder material,
   e. from 2 to 20 weight percent of said volatilized silica slurry, and
   f. from 0 to 5 weight percent water.

2. An unshaped, unfired refractory material as recited in claim 1 wherein said mixture further includes from 5 to 30 weight percent silicon carbide.

3. An unshaped, unfired refractory material as recited in claim 1 wherein said binder material comprises a bond clay.

4. An unshaped, unfired refractory material as recited in claim 1 wherein said aggregate alumina-containing refractory comprises crushed fused alumina.

5. An unshaped, unfired refractory material as recited in claim 1 wherein said aggregate alumina-containing refractory comprises tabular alumina.

6. An unshaped, unfired refractory material as recited in claim 1 wherein said aggregate alumina-containing refractory comprises calcined kaolin.

7. An unshaped, unfired refractory material as recited in claim 1 wherein said concentrated acid is selected from the group consisting of hydrochloric acid and phosphoric acid.

8. An unshaped, unfired refractory material as recited in claim 1 wherein said concentrated acid is hydrochloric acid.

9. An unshaped, unfired refractory material as recited in claim 1 wherein said concentrated acid is 20°Be hydrochloric acid.

10. An unshaped, unfired refractory material as recited in claim 1 wherein said green strength binder comprises a clay binder.

11. An unshaped, unfired refractory material as recited in claim 10 and further including from 3 to 15 weight percent of an asphaltite binder.

* * * * *